(12) United States Patent
Schwartz et al.

(10) Patent No.: US 6,456,230 B2
(45) Date of Patent: Sep. 24, 2002

(54) METHOD AND APPARATUS FOR DETECTING VEHICLE STOP

(75) Inventors: Brian C. Schwartz, Sterling Heights; Hubert Bryan Riley, Novi, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 1 day.

(21) Appl. No.: 09/790,990

(22) Filed: Feb. 22, 2001

Related U.S. Application Data

(60) Provisional application No. 60/183,945, filed on Feb. 22, 2000.

(51) Int. Cl.[7] .............................. G01S 13/93; B60T 8/00
(52) U.S. Cl. .............................. 342/71; 342/70; 701/70; 701/96; 701/301
(58) Field of Search ............................ 342/70, 71, 104; 701/70, 78, 96, 116, 301; 340/425.5, 435; 303/122.05

(56) References Cited

U.S. PATENT DOCUMENTS

| | | | | |
|---|---|---|---|---|
| 4,346,774 A | * | 8/1982 | Hirota et al. | 180/167 |
| 6,254,204 B1 | * | 7/2001 | Hara et al. | 303/183 |
| 6,292,753 B1 | * | 9/2001 | Sugimoto et al. | 701/301 |

* cited by examiner

Primary Examiner—Ian J. Lobo
(74) Attorney, Agent, or Firm—Robert M. Sigler

(57) ABSTRACT

A stop determination for a vehicle is provided by requiring simultaneous stop determinations by at least one wheel speed sensor providing output pulses at a rate inversely proportional to vehicle speed and a forward looking radar unit for sensing an object in the vehicle's path and providing a range rate signal with respect to that object. The determination is particularly useful when the time between consecutive pulses at a predetermined minimum speed indicative of an essentially stopped vehicle is greater than a predetermined maximum time period allowed for the determination. Each of the signals complements the other to provide a vehicle stopped determination that is more reliable than either can provide by itself and is workable for most purposes, including stop and go vehicle speed control.

9 Claims, 4 Drawing Sheets

METHOD AND APPARATUS FOR DETECTING VEHICLE STOP

REFERENCED APPLICATIONS

This application references Provisional U.S. Patent Application No. 60/183,945, filed Feb. 22, 2000 and entitled METHOD FOR STOP DETECTION IN A STOP AND GO VEHICLE OPERATION CONTROL, the disclosure of which is incorporated by reference.

TECHNICAL FIELD OF THE INVENTION

The technical field of this invention is automatic control of motor vehicles.

BACKGROUND OF THE INVENTION

The development of automatic control for motor vehicles is proceeding well beyond the simple, speed maintaining automatic throttle controls known popularly as "cruise controls". The automatic speed maintenance is being extended to lower speeds, even to stop and go operation; and such operation requires the ability to accurately and reliably sense when a vehicle is stopped.

Most vehicles manufactured today are equipped with one or more wheel speed sensors, due to their widespread use in anti-lock brake and traction control systems. A typical wheel speed sensor has a rotational member with a known number of teeth in a ring configuration. This member is attached to the wheel of the vehicle so that it rotates with the wheel. A stationary tooth sensor adjacent the member generates a pulse train signal from the detected passage of the teeth as the member rotates with the wheel. The speed of the wheel is calculated from the time duration T between pulses due to consecutive teeth:

$$\text{Wheel Speed} = x/(y)(T),$$

where x is the longitudinal distance traveled per rotation of the member, y is the number of pulses (teeth) per rotation, and T is the time between pulses. Any combination of wheels can be used to calculate an estimate of the current vehicle speed.

But if the vehicle is stopped, the pulses cease; and the timebetween pulses becomes indefinite. Thus, absolute sensing of vehicle stop with such sensors is impossible, since it would require an infinite time for the detection. But by the selection of a threshold $T_{max}$, the stationary determination can be made when the time between pulses exceeds the threshold. This is the same as limiting the low wheel speed and calling anything below a speed $WS_{stop}$ as indicating a stationary vehicle. For example, a stopped vehicle may be defined, with respect to a particular wheel speed sensor on the vehicle, as requiring no two consecutive signal pulses from the wheel speed sensor for a $T_{max}$ of about one half (0.5) second. But a problem occurs with such sensors if the specification for stop determination requires that it be performed within a shorter time period, for example one third (0.33) second. Even if no second pulse is received from the wheel speed sensor for one third of a second after a first pulse when the time allotted for determination has elapsed, there is no guarantee that it will not occur prior to one half second after the first pulse.

In addition, most wheel speed sensors used in vehicles for anti-lock braking and traction control tend to be less expensive passive wheel speed sensors rather than more expensive active wheel speed sensors. Passive wheel speed sensors provide output pulses generated solely by voltage induced in a coil by motion of the passing teeth of the sensor disk rotation with the wheel. The amplitude of pulses generated by such induction decreases with the speed of the motion. Thus, at the low wheel speeds at which stoppage of the vehicle is determined, the pulses generated by passive wheel speed sensors tend to be of significantly lower amplitude and have a more rounded, less distinct shape than those formed at the higher wheel speeds typical of anti-lock braking or traction control events, and this limits the accuracy of pulse edge detection at such low wheel speeds.

SUMMARY OF THE INVENTION

The apparatus and method of the invention provide a stopped vehicle determination within a predetermined maximum determination time, period, wherein a stopped vehicle is defined as a vehicle with forward speed lower than a predetermined minimum speed indicative of an essentially stopped vehicle and the vehicle has a plurality of wheels.

A rotational wheel speed sensor coupled to one of the plurality of wheels is of the type that provides a series of consecutive pulses having a time period therebetween varying inversely with vehicle forward speed, with the time period between pulses at the predetermined minimum speed indicative of an essentially stopped vehicle being greater than the predetermined maximum time period. A wheel speed determined stopped vehicle signal is generated when the time between pulses from the rotational wheel speed sensor is at least equal to the predetermined maximum determination period.

A range rate signal, relative to a detected object forward of the vehicle, is derived from a forward-looking radar unit; and a radar determined stopped vehicle signal is generated when the range rate signal from the forward-looking radar is less than a predetermined threshold. Finally, a combined stopped vehicle signal is generated when the wheel speed stopped vehicle signal and the radar stopped vehicle signal exist simultaneously.

The wheel speed determined stopped vehicle signal does not by itself guarantee a stopped vehicle, since it must be generated by the end of the maximum determination time, before the end of the period allowed for a second pulse from the wheel speed sensor. Likewise, the radar determined stopped vehicle signal does not by itself guarantee a stopped vehicle, since a forward object with an essentially zero range rate might be another vehicle proceeding forward at essentially the same speed. But when used together in an AND logic configuration, the radar determined stopped vehicle signal can provide the final degree of accuracy for high reliability to a wheel speed determined stopped vehicle signal that guarantees a forward vehicle speed at least close to zero.

DETAILED DESCRIPTION OF THE INVENTION

Figure 1:
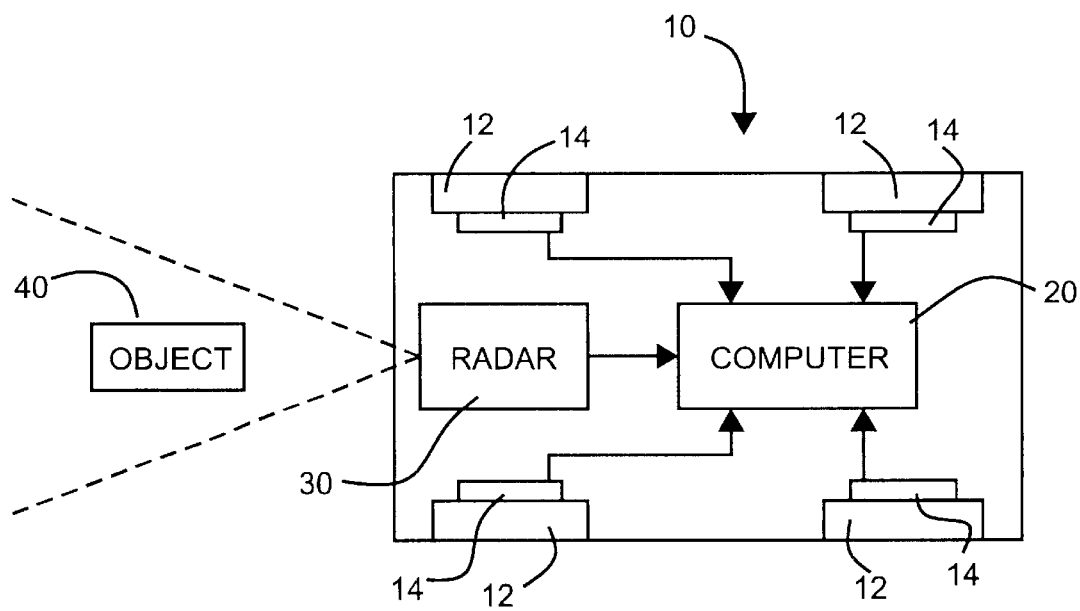
FIG. 1 is a schematic diagram of a vehicle equipped with apparatus according to this invention.
Figure 2:
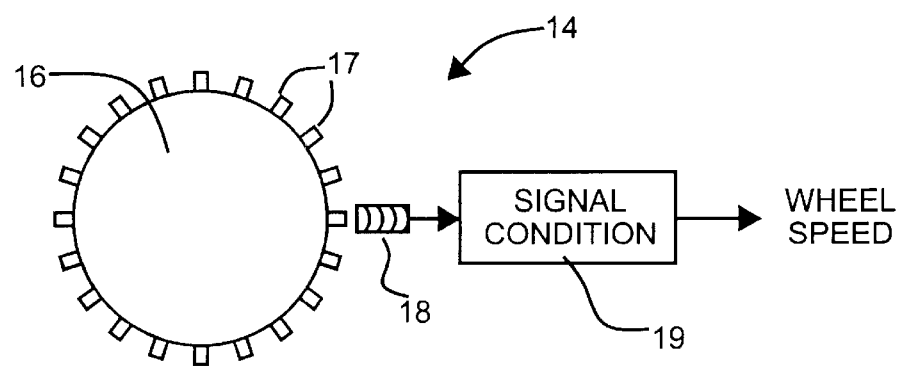
FIG. 2 is a schematic diagram of a wheel speed sensor for use in the apparatus of FIG. 1.

FIG. 1 shows a schematic diagram of a motor vehicle equipped with apparatus according to this invention. Vehicle 10 has a plurality of wheels 12, normally four in number; and one or more of the wheels 12 are provided with wheel speed sensors 14. As shown in FIG. 2, a wheel speed sensor 14 may preferably comprise a disk 16 with teeth 17 and a tooth sensor 18 positioned to sense the passage of individual teeth 17 passing the tooth sensor 18 as disk 16 rotates with its associated wheel 12. Such wheel speed sensors, using magnetic sensing technology, are in common use on motor vehicles in anti-lock braking and traction control systems with disks having 47 teeth; but other sensing technologies or numbers of teeth may be used if desired. The passage of each tooth 17 causes tooth sensor 18 to provide an electrical pulse on an output line, which pulse may be filtered or otherwise conditioned for clearer and sharper recognition by signal condition circuit 19, so that the time period between individual consecutive output pulses from wheel speed sensor 14 is more accurately inversely proportional to the wheel speed according to the following equation:

Wheel Speed=$x/(y)(T)$, where x is the longitudinal distance traveled per rotation of the member, y is the number of pulses (teeth) per rotation, and T is the time period between pulses.

Referring again to FIG. 1, the signals from wheel sensors 14 are provided to a digital computer 20 that contains a routine or subroutine for determining a vehicle stop condition in accordance with this invention in response to the signals from wheel speed sensors 14 and other input signals to be described below. In practice, computer 20 will be programmed as a control computer for a plurality of functions in vehicle 10 and may even act in concert with other control computers. For example, computer 20 may be a chassis control computer which includes brake control functions such as anti-lock braking and acts in concert with an engine control computer for traction control. The pulse decoding programming for deriving a numerical vehicle speed value from the incoming pulses from wheel speed sensors 14 may be conveniently located in computer 20 and shared with whatever other control computers require such a signal by a communication bus or dedicated communication link, as is known in the art. In this embodiment, both the pulse decoding programming or the prior art and the stop determination programming that is unique to this invention are conveniently located in computer 20. Alternatively, the functions described in the flow charts of FIGS. 3–5 could be distributed among two or more computers as desired, with communication among the computers.

Vehicle 10 is also equipped with a forward looking radar unit 30, conveniently located on the front of the vehicle and directed forward to sense objects in the vehicle's driving path. Such vehicle mounted radar units are known in the art, although not yet common on ground based vehicles; and suitable radar units are available for use in the apparatus of this invention. Radar unit 30 directs electromagnetic signals forward of the vehicle, which signals may be any that are safe and subject to reflection by a physical object, including coherent visible light (laser). Radar unit 30 senses objects such as object 40 forward of the vehicle in the normal manner by receiving signals reflected from those objects. Such objects may be stationary objects beside the road or vehicles on the road, whether stationary or not; but the radar unit will typically choose a single object according to a predetermined algorithm if multiple objects are detected. The precise details of this depend on the particular radar unit selected. From the reflected signals, radar unit may derive a range rate determining signal, such as the range (distance) to the object, the range rate (speed relative to the vehicle) of the object, or both. If a range rate signal is generated by the radar unit, it is provided to computer 20. If no range rate signal is available, the range signal may be provided to computer 20, in which the range rate will be derived from the derivative of the range signal.

Figure 3:
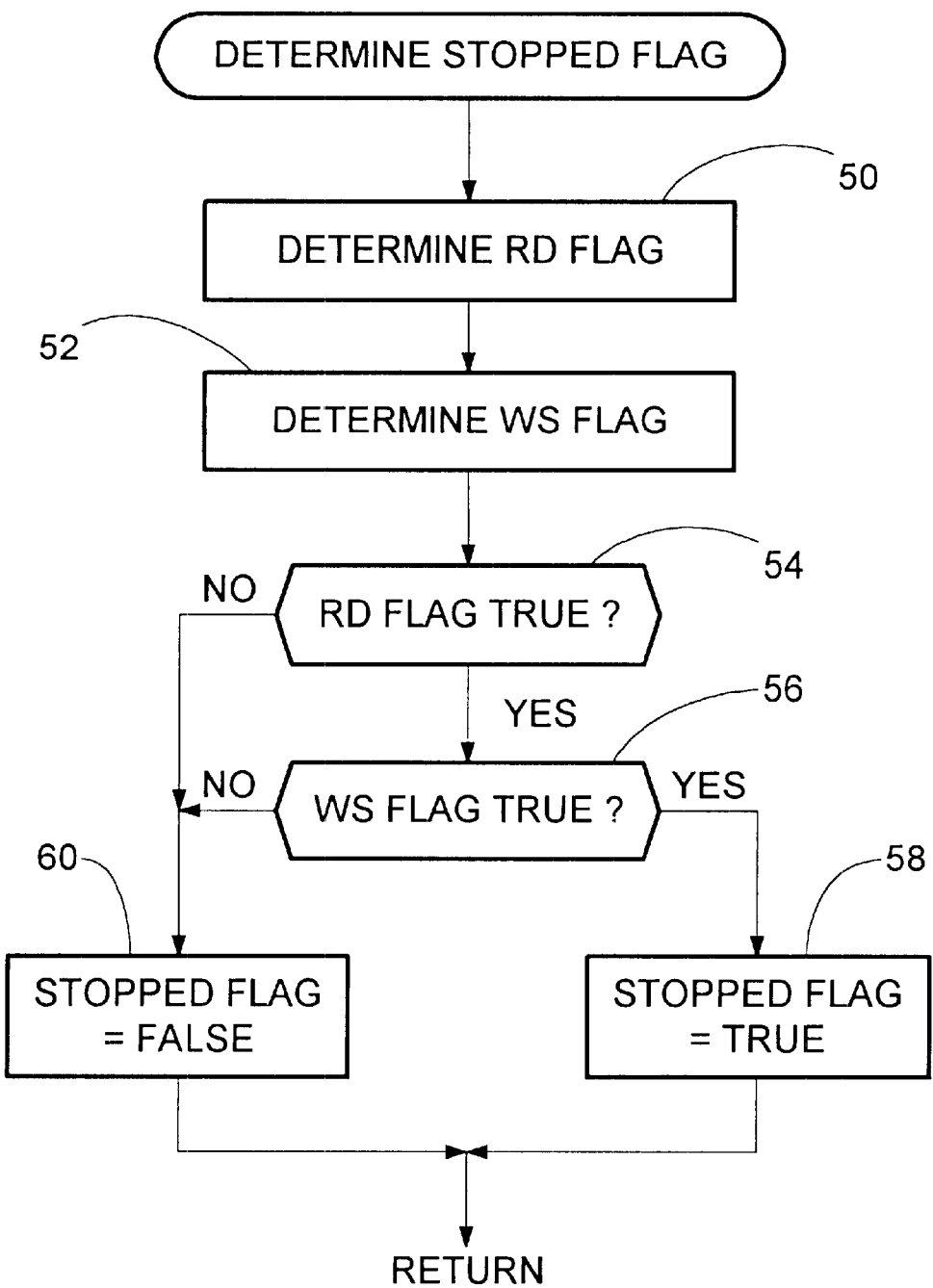
FIGS. 3–5 are flow charts describing the operation of the apparatus of FIG. 1 and 2.
Figure 4:
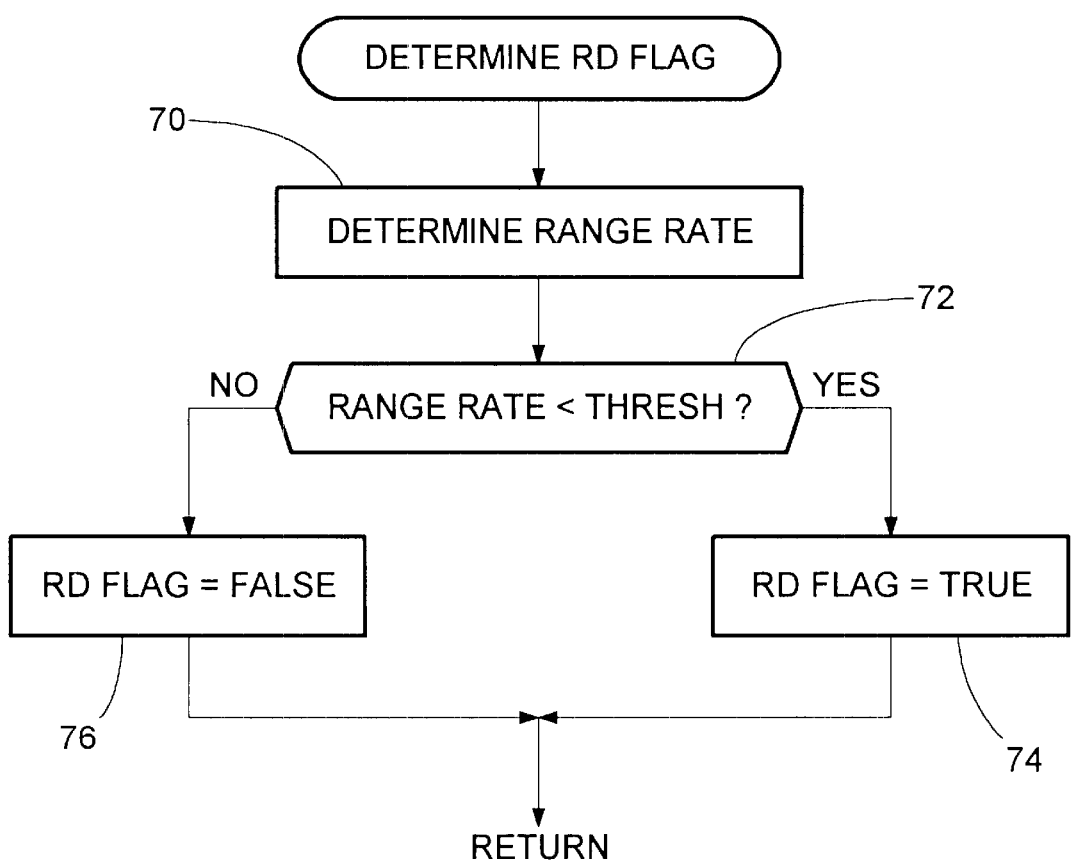
Figure 5:
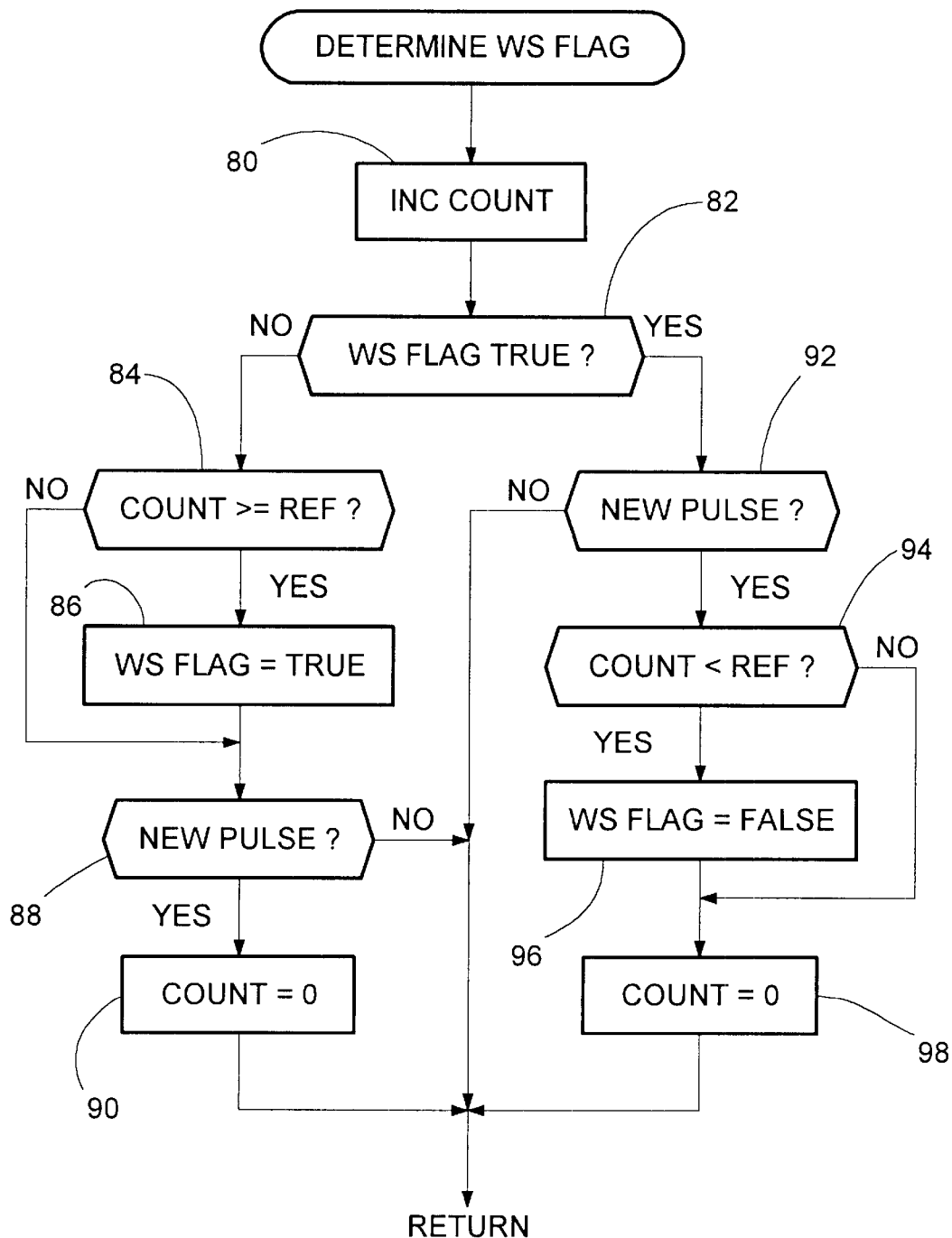

Computer 20 receives the wheel speed signals from wheel speed sensors 14 and the range or range rate signal from radar unit 20 and performs a program shown in FIGS. 3, 4 and 5. FIG. 3 shows the overall logic of determining a binary STOPPED FLAG that indicates whether the vehicle is considered stopped or not; FIGS. 4 and 5 show subroutines that, in this embodiment, are called by the program of FIG. 3. Alternatively, either of both of the subroutines of FIGS. 4 and 5 could be separate routines run independently from the program of FIG. 3, perhaps even in different computers, as long as the binary flag values determined by these routines are made available for the program of FIG. 3 as required. The program of FIG. 3 is run, for example, every 10 milliseconds, so that it typically runs at a repetition rate several times faster than the repetition rate of pulses from wheel speed sensor 14 near the vehicle speed defining a stopped vehicle. In addition, if more than one wheel speed sensor 14 is checked in the determination, the program is run for each wheel speed sensor.

Referring to FIG. 3, routine DETERMINE STOPPED FLAG begins at step 50 by determining whether the signal from radar unit 30 indicates a stopped vehicle. This is accomplished in this embodiment by running a subroutine DETERMINE RD FLAG, to be described below. The result of this subroutine is the updating of a binary value RD FLAG, with TRUE indicating that the vehicle is considered stopped and FALSE indicating it is not. At step 52, it is determined whether the signal from the wheel speed sensor 14 indicates a stopped vehicle. This is accomplished in this embodiment by running a subroutine DETERMINE WS FLAG, to be described below. The result of this subroutine is the updating of a binary value WS FLAG, with TRUE indicating that the vehicle is considered stopped and FALSE indicating it is not. At step 54, the RD FLAG is checked. If it is TRUE, the WS FLAG is checked at step 56. If it is also TRUE, the STOPPED FLAG is set TRUE at step 58. If either the RD FLAG or the WS FLAG is FALSE, the STOPPED FLAG is set FALSE at step 60.

FIG. 4 shows the subroutine DETERMINE RD FLAG. It begins at step 70 by determining the RANGE RATE relative to object 40 detected by radar unit 30. If radar unit 30 determines and outputs RANGE RATE, the signal needs only to be read. If radar unit 30 only outputs a RANGE signal, this signal is time differentiated in the normal manner to provide RANGE RATE. The latter approach will not provide as accurate a signal, but it allows the use of a typically less expensive radar unit 30. At step 72, RANGE RATE is compared with a predetermined threshold THRESH. If the value of RANGE RATE is less than THRESH, the RD FLAG is set TRUE at step 74; if it is not less, the RD FLAG is set FALSE at step 76.

FIG. 5 shows a sample embodiment of the subroutine DETERMINE WS FLAG. There are many ways of implementing this subroutine, the basic purpose of which is to detect when a predetermined maximum determination time elapses between consecutive pulses from wheel speed sensor 14. As will be seen, this requires multiple loops of the program; and this particular embodiment is intended to provide a smooth and stable switching between TRUE and FALSE values of the WS FLAG.

The subroutine begins at step 80 by incrementing a value COUNT. Since the program, and therefore the subroutine, is run with a time based repetition, the value COUNT is a relative time clock. At step 82, the value of the WS FLAG is checked. If the status of the flag is FALSE (not TRUE), which means that the vehicle is not considered stopped, the subroutine compares at step 84 the value of COUNT with a predetermined reference REF that corresponds to a predetermined maximum determination time period, with reference to the repetition rate of the program. For example, if the predetermined maximum determination time period is 0.4 seconds and the program runs every 0.1 second, REF could be predetermined equal to 4.

If the value of COUNT is greater than or equal to 4, the predetermined maximum determination time period has elapsed; and the WS FLAG is set to TRUE at step 86. If the value of COUNT is less than REF, step 86 is skipped. At step 88, the subroutine determines whether a new pulse has been received since the last loop. This information is provided by the signal from wheel speed sensor 14, with appropriate level crossing and filtering circuitry and/or programming as is known in the art. Computer 20 may receive this information from wheel speed sensor 14 independently of this program and set an indicating flag which can be checked by this program. If a new pulse has been received, the value of COUNT is reset to zero at step 90; if not, step 90 is skipped.

Returning attention to step 82, if the WS FLAG is TRUE, the subroutine proceeds to step 92 wherein the presence of a new pulse is checked as described above. If a new pulse has been received, the value of COUNT is compared to REF at step 94. If it is less than REF, the WS FLAG is reset to FALSE at step 96 and COUNT is reset to zero at step 98. If the value of COUNT is not less than REF at step 94, the subroutine skips step 96 and proceeds directly to step 98, where COUNT is reset to zero. From step 92 if no new pulse is detected, or from either of steps 90 and 98, the subroutine returns to the program from which it was called.

As seen above, this embodiment of subroutine DETERMINE WS FLAG provides separate paths (steps 84–90 and steps 92–98) depending on the value of the WS FLAG when the subroutine is called. If the flag is FALSE (vehicle not stopped), it will remain FALSE unless step 84 determines that the required number of loops, as indicated by the value of COUNT, have passed between new pulses. But when the flag is TRUE, it will stay true until a new pulse is detected at step 92 and the value of COUNT less than REF at step 94, which indicates that two consecutive pulses have been received in less than the predetermined maximum determination time period. The subroutine provides an increment of COUNT on every pass and also resets the value of COUNT to zero in either branch if a new pulse is detected. The values of COUNT and the WS FLAG may be initialized to zero and FALSE, respectively, at the beginning of vehicle operation, at the beginning of system operation or at some other convenient time when the subroutine is first called.

For a number of reasons, more than one of wheel speed sensors 14 may be checked by the subroutine of FIG. 5 for a wheel speed indicating a stopped vehicle. For example, two such wheel speed sensors on opposite sides of a vehicle may provide additional information providing more accuracy in a vehicle turning situation, wherein the wheel speed sensor on the inside of the turn may indicate a misleadingly low forward speed. If desired, it might be required that both wheel speed sensors indicate a stopped vehicle. This could be accomplished by running the subroutine of FIG. 5 separately for each wheel speed sensor and requiring in the program of FIG. 3 that the values of WS FLAG for both sensors be TRUE.

What is claimed is:

1. Apparatus for detecting, within a predetermined maximum determination time period, a forward speed of a vehicle lower than a predetermined minimum speed indicative of an essentially stopped vehicle, the vehicle having a plurality of wheels, the apparatus comprising, in combination:

a rotational wheel speed sensor coupled to one of the plurality of wheels, the rotational wheel speed sensor being of the type that provides a series of consecutive pulses having a time period therebetween varying inversely with vehicle forward speed, the time period between pulses at the predetermined minimum speed indicative of an essentially stopped vehicle being greater than the predetermined maximum determination time period;

means for generating a wheel speed determined stopped vehicle signal when the time between pulses from the rotational wheel speed sensor is at least equal to the predetermined maximum determination time period;

a forward-looking radar unit providing a range rate determining signal relative to a detected object forward of the vehicle;

means for generating a radar determined stopped vehicle signal from the range rate determining signal when the range rate signal from the forward-looking radar is less than a predetermined threshold; and logic means generating a combined stopped vehicle signal when the wheel speed stopped vehicle signal and the radar stopped vehicle signal exist simultaneously.

2. Apparatus according to claim 1 wherein the rotational wheel speed sensor comprises a toothed disk rotating with the associated wheel and stationary apparatus responsive to the passage of consecutive teeth to generate the pulses.

3. Apparatus according to claim 1 in which the range rate determining signal provided by the radar unit indicates the range between the vehicle and the detected object and the means for determining a radar determined stopped vehicle signal derives a range rate signal from the range rate determining signal by differentiation.

4. Apparatus according to claim 1 in which the range rate determining signal provided by the radar unit is the range rate of the vehicle relative to the detected object.

5. A method for detecting, within a predetermined maximum determination time period, a forward speed of a vehicle lower than a predetermined minimum speed indicative of an essentially stopped vehicle, the vehicle having a plurality of wheels, the method comprising the steps:

providing at least one of the wheels with a rotational wheel speed sensor of the type that provides a series of consecutive pulses having a time period therebetween varying inversely with vehicle forward speed, the time period between pulses at the predetermined minimum speed indicative of an essentially stopped vehicle being greater than the predetermined maximum determination time period;

generating a wheel speed determined stopped vehicle signal when the time between pulses from the rotational wheel speed sensor is at least equal to the predetermined maximum determination time period;

providing a forward-looking radar unit providing a range rate determining signal relative to a detected object forward of the vehicle;

generating a radar determined stopped vehicle signal from the range rate determining signal when the range rate signal from the forward-looking radar is less than a predetermined threshold; and generating a combined stopped vehicle signal when the wheel speed stopped vehicle signal and the radar stopped vehicle signal exist simultaneously.

6. Apparatus for detecting, within a predetermined maximum determination time period, a forward speed of a vehicle lower than a predetermined minimum speed indicative of an essentially stopped vehicle, the vehicle having a plurality of wheels, the apparatus comprising, in combination:

a rotational wheel speed sensor coupled to one of the plurality of wheels, the rotational wheel speed sensor being of the type that provides a series of consecutive pulses having a time period therebetween varying inversely with vehicle forward speed, the time period between pulses at the predetermined minimum speed indicative of an essentially stopped vehicle being greater than the predetermined maximum determination time period;

a forward-looking radar unit providing a range rate determining signal relative to a detected object forward of the vehicle; and digital computer apparatus programmed for:
   (1) responsive to the pulses from the rotational wheel speed sensor, generating a wheel speed determined stopped vehicle signal when the time between pulses from the rotational wheel speed sensor is at least equal to the predetermined maximum determination time period;
   (2) responsive to the range rate determining signal from the radar unit, generating a radar determined stopped vehicle signal from the range rate determining signal when the range rate signal from the forward-looking radar is less than a predetermined threshold; and
   (3) generating a combined stopped vehicle signal when the wheel speed stopped vehicle signal and the radar stopped vehicle signal exist simultaneously.

7. Apparatus for detecting, within a predetermined maximum determination time period, a forward speed of a vehicle lower than a predetermined minimum speed indicative of an essentially stopped vehicle, the vehicle having a plurality of wheels and a forward-looking radar unit providing a range rate determining signal relative to a detected object forward of the vehicle, the apparatus comprising, in combination:

a rotational wheel speed sensor coupled to one of the plurality of wheels, the rotational wheel speed sensor being of the type that provides a series of consecutive pulses having a time period therebetween varying inversely with vehicle forward speed, the time period between pulses at the predetermined minimum speed indicative of an essentially stopped vehicle being greater than the predetermined maximum determination time period; and digital computer apparatus programmed for:
   (1) responsive to the pulses from the rotational wheel speed sensor, generating a wheel speed determined stopped vehicle signal when the time between pulses from the rotational wheel speed sensor is at least equal to the predetermined maximum determination time period;
   (2) responsive to the range rate determining signal from the radar unit, generating a radar determined stopped vehicle signal from the range rate determining signal when the range rate signal from the forward-looking radar is less than a predetermined threshold; and
   (3) generating a combined stopped vehicle signal when the wheel speed stopped vehicle signal and the radar stopped vehicle signal exist simultaneously.

8. Apparatus for detecting, within a predetermined maximum determination time period, a forward speed of a vehicle lower than a predetermined minimum speed indicative of an essentially stopped vehicle, the vehicle having a plurality of wheels with a rotational wheel speed sensor coupled to one of the plurality of wheels, the rotational wheel speed sensor being of the type that provides a series of consecutive pulses having a time period therebetween varying inversely with vehicle forward speed, the time period between pulses at the predetermined minimum speed indicative of an essentially stopped vehicle being greater than the predetermined maximum determination time period, the apparatus comprising, in combination:

a forward-looking radar unit providing a range rate determining signal relative to a detected object forward of the vehicle; and digital computer apparatus programmed for:
   (1) responsive to the pulses from the rotational wheel speed sensor, generating a wheel speed determined stopped vehicle signal when the time between pulses from the rotational wheel speed sensor is at least equal to the predetermined maximum determination time period;
   (2) responsive to the range rate determining signal from the radar unit, generating a radar determined stopped vehicle signal from the range rate determining signal when the range rate signal from the forward-looking radar is less than a predetermined threshold; and
   (3) generating a combined stopped vehicle signal when the wheel speed stopped vehicle signal and the radar stopped vehicle signal exist simultaneously.

9. Digital computer apparatus for detecting, within a predetermined maximum determination time period, a forward speed of a vehicle lower than a predetermined minimum speed indicative of an essentially stopped vehicle, the vehicle having a plurality of wheels with a rotational wheel speed sensor coupled to one of the plurality of wheels, the rotational wheel speed sensor being of the type that provides a series of consecutive pulses having a time period therebetween varying inversely with vehicle forward speed, the time period between pulses at the predetermined minimum speed indicative of an essentially stopped vehicle being greater than the predetermined maximum determination time period, the vehicle also having a forward-looking radar unit providing a range rate determining signal relative to a detected object forward of the vehicle, the digital computer apparatus being programmed for:

(1) responsive to the pulses from the rotational wheel speed sensor, generating a wheel speed determined stopped vehicle signal when the time between pulses from the rotational wheel speed sensor is at least equal to the predetermined maximum determination time period;
   (2) responsive to the range rate determining signal from the radar unit, generating a radar determined stopped vehicle signal from the range rate determining signal when the range rate signal from the forward-looking radar is less than a predetermined threshold; and
   (3) generating a combined stopped vehicle signal when the wheel speed stopped vehicle signal and the radar stopped vehicle signal exist simultaneously.

* * * * *